(12) United States Patent
Harrison et al.

(10) Patent No.: US 6,553,098 B1
(45) Date of Patent: Apr. 22, 2003

(54) APPARATUS AND METHOD FOR ASSESSING LEAKAGE FROM CABLE NETWORKS

(75) Inventors: Warner George Harrison, Medfield, MA (US); John Winsor Lovell, Sherborn, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/546,968

(22) Filed: Apr. 11, 2000

(51) Int. Cl.⁷ ............................. H04M 1/24; H04M 3/22
(52) U.S. Cl. .................. 379/22.03; 379/1.03; 379/1.04; 379/22.04; 379/27.01; 379/29.01
(58) Field of Search .................... 379/1.01, 1.03, 379/1.04, 3, 10.01, 16, 17, 22, 22.01, 22.02, 22.03, 22.04, 26.01, 27.01, 27.03, 27.04, 29.01; 375/224; 324/76.11; 370/241, 244, 249

(56) References Cited

U.S. PATENT DOCUMENTS

| | | | | |
|---|---|---|---|---|
| 4,207,431 A | * | 6/1980 | McVoy ......................... | 379/22 |
| 4,700,222 A | * | 10/1987 | Large et al. ................... | 358/86 |
| 5,164,989 A | * | 11/1992 | Brandman et al. ...... | 379/406.11 |
| 5,166,954 A | * | 11/1992 | Grizmala et al. ............. | 379/10 |
| 5,282,224 A | * | 1/1994 | Harada ......................... | 375/10 |
| 5,410,585 A | * | 4/1995 | Kawaharata .................... | 379/6 |
| 5,559,854 A | * | 9/1996 | Suzuki ...................... | 379/27.01 |
| 6,005,518 A | * | 12/1999 | Kallina ........................ | 342/459 |
| 6,154,447 A | * | 11/2000 | Vedder ........................ | 370/244 |
| 6,215,855 B1 | * | 4/2001 | Schneider .................... | 379/22 |
| 6,278,769 B1 | * | 8/2001 | Bella ........................ | 379/29.11 |
| 6,327,250 B1 | * | 12/2001 | Chen et al. .................. | 370/241 |
| 6,373,923 B1 | * | 4/2002 | Williamson et al. ...... | 379/22.01 |
| 6,389,111 B1 | * | 5/2002 | Hollier et al. ................ | 379/28 |

* cited by examiner

Primary Examiner—Curtis Kuntz
Assistant Examiner—Quoc D Tran
(74) Attorney, Agent, or Firm—Leonard Charles Suchyta; James K. Weixel

(57) ABSTRACT

An apparatus for assessing signal coupling and radiation from cable networks by exciting the network with multiple broadband signals modulated by a common source, the networks having a plurality of channels, including a noise generator to generate a plurality of test signals, a plurality of modulators, each coupled to one of the plurality of channels, for modulating the plurality of test signals, and a control apparatus coupled to the plurality of modulators for controlling coupling and decoupling of each of the plurality of channels to the signal generating means.

22 Claims, 5 Drawing Sheets

APPARATUS AND METHOD FOR ASSESSING LEAKAGE FROM CABLE NETWORKS

BACKGROUND OF THE INVENTION

1. Field of the Invention

This invention pertains in general to telephone cable networks and, more particularly, to an apparatus and method for assessing signal leakage from the cable networks by exciting the networks with multiple broadband signals.

2. Description of the Related Art

Current developments in the telephone industry show a trend to deploy increased broadband access to a large number of customers throughout the telephone networks. In particular, new technologies permit the telephone industry to deploy a large number of modems that employ signals having frequencies above those anticipated during the deployment of copper-conductor networks, one result of which is a possible increase in signal leakage.

In the United States, the Federal Communications Commission ("FCC") has jurisdiction over all devices that use and could radiate electromagnetic fields. To that end, the FCC has established maximum signal leakage levels permitted for operating electronic equipment. The FCC currently does not provide guidelines to govern the new modem technologies running over existing copper-conductor channels, or loops, in telephone networks. However, regulations may be implemented to require expenditures on the part of network providers to meet existing or new requirements on signal leakage. Assessment of signal leakage in the network would be required.

One technique for signal leakage or coupling assessment involves testing of certain channels of telephone networks by using signals that are representative of the signals intended to be run over the channels. Such intended signals would include audio frequency signals from users of the telephone network as well as the new high frequency signals. Conventional leakage assessment techniques are generally classified as either narrowband or broadband in nature. Narrowband leakage assessment can be either fixed in frequency or swept over a range of frequencies. However, such narrowband techniques typically involve the use of a narrowband detector to limit the noise bandwidth of the detection system and increase the detection sensitivity. For measurements in which the detector is remote from the source, the test source and detector must be synchronized in frequency. Such tuning of the source and detector can be problematic where signal levels may be below the level of the noise, resulting in interference with signals being transmitted in the telephone network.

Known broadband sources include standing wave ratio ("SWR") meters and continuous wave ("CW") sources. For a CW source, test signals are modulated at 1 KHz with either a square or sine wave. A diode detector is used to detect and demodulate the test signals. However, broadband sources used with broadband detection are inappropriate because of the high noise levels at discrete frequencies due to transmitters operating in the band of frequencies of interest. In addition, a conventional broadband leakage assessment only excites one channel of telephone networks at a time, and therefore requires an extended period of time to sweep all the channels of the network.

SUMMARY OF THE INVENTION

Accordingly, the present invention is directed to an apparatus and method for assessing signal leakage that substantially obviates one or more of the problems due to limitations and disadvantages of the related art.

To achieve these and other advantages, and in accordance with the purpose of the invention as embodied and broadly described, there is provided an apparatus for assessing signal leakage in a telephone network having a plurality of channels that includes a signal generator providing a plurality of test signals to the plurality of channels, and a channel control that connects and disconnects each of the test signals to one of the plurality of channels.

In one aspect of the invention, the apparatus further includes a modulator to modulate one of the test signals wherein the modulator is coupled to one of the plurality of channels.

In another aspect of the invention, the apparatus includes a modulation source coupled to each of the plurality of modulators.

In yet another aspect of the invention, the signal level of the test signals is below the signal level that would cause interference to an audio signal transmitted in the telephone network.

In yet another aspect of the invention, the signal generator includes a clock, an address counter coupled to the clock, and a read-only-memory coupled to the address counter.

Also in accordance with the invention, there is provided an apparatus for assessing signal leakage in a telephone network having a plurality of channels that includes signal generating means for generating a plurality of broadband test signals, a plurality of modulators, each coupled to one of the plurality of channels, for modulating the plurality of test signals, and control means coupled to the plurality of modulators for controlling coupling and decoupling of each of the plurality of channels to the signal generating means.

Further in accordance with the invention, there is provided a method for assessing signal leakage in a telephone network having a plurality of channels that includes generating a plurality of test signals, modulating each of the plurality of test signals with a common modulation source, selectively providing each of the plurality of test signals to the plurality of channels, and assessing test signal leakage on one of the plurality of channels.

In one aspect of the invention, the method simultaneously measures test signals coupled from the other plurality of channels.

In another aspect of the invention, the step of modulating each of the plurality of test signals with a common modulation source comprises a step of coded modulation.

Additional features and advantages of the invention will be set forth in the description which follows, and in part will be apparent from the description, or may be learned by practice of the invention. The objectives and other advantages of the invention will be realized and attained by the structures and methods particularly pointed out in the written description and claims thereof, as well as the appended drawings.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION

Figure 1:
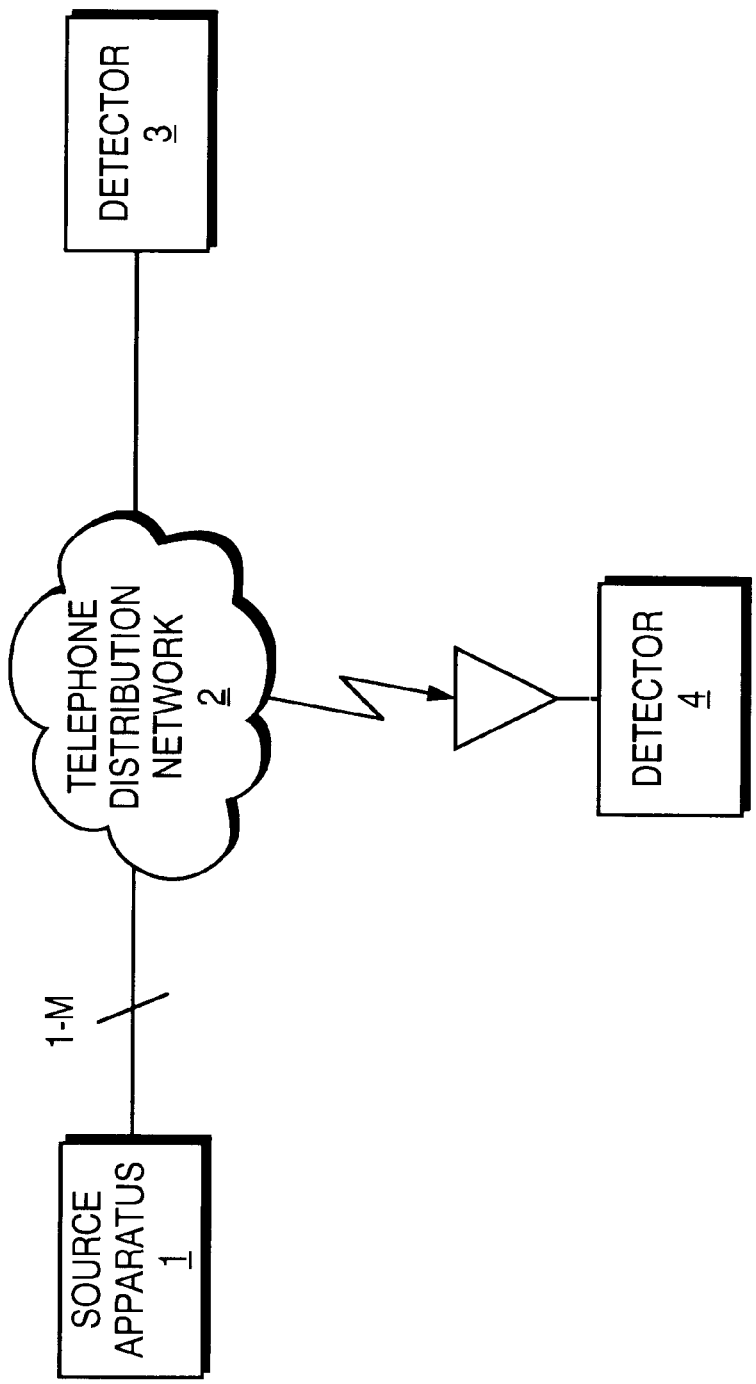
FIG. 1 shows the general application of the invention in a telephone distribution network.

In accordance with the present invention, there are provided an apparatus and method for measuring signal leakage in telephone networks. Specifically, the present invention is directed to an apparatus and method for assessing leakage of signals from telephone networks by exciting the networks with multiple broadband test signals that are modulated by a common source. FIG. 1 indicates the overall application of this device. Referring to FIG. 1, signals generated by a source apparatus 1 do not interfere with normal usage of loops within a telephone network 2, one such usage being transmission of voice telephony signals. In addition, the present invention allows for assessment of one channel 3 and measurement of signals coupled from other channels.

Source apparatus 1 couples test signals 1-M onto M loops (not shown) within telephone distribution network 2. A tuned detector 4 may be used to measure signals coupled onto a loop in telephone distribution network 2, or tuned detector 4 may be used to measure the signals radiated by the telephone distribution network 2.

Figure 2:
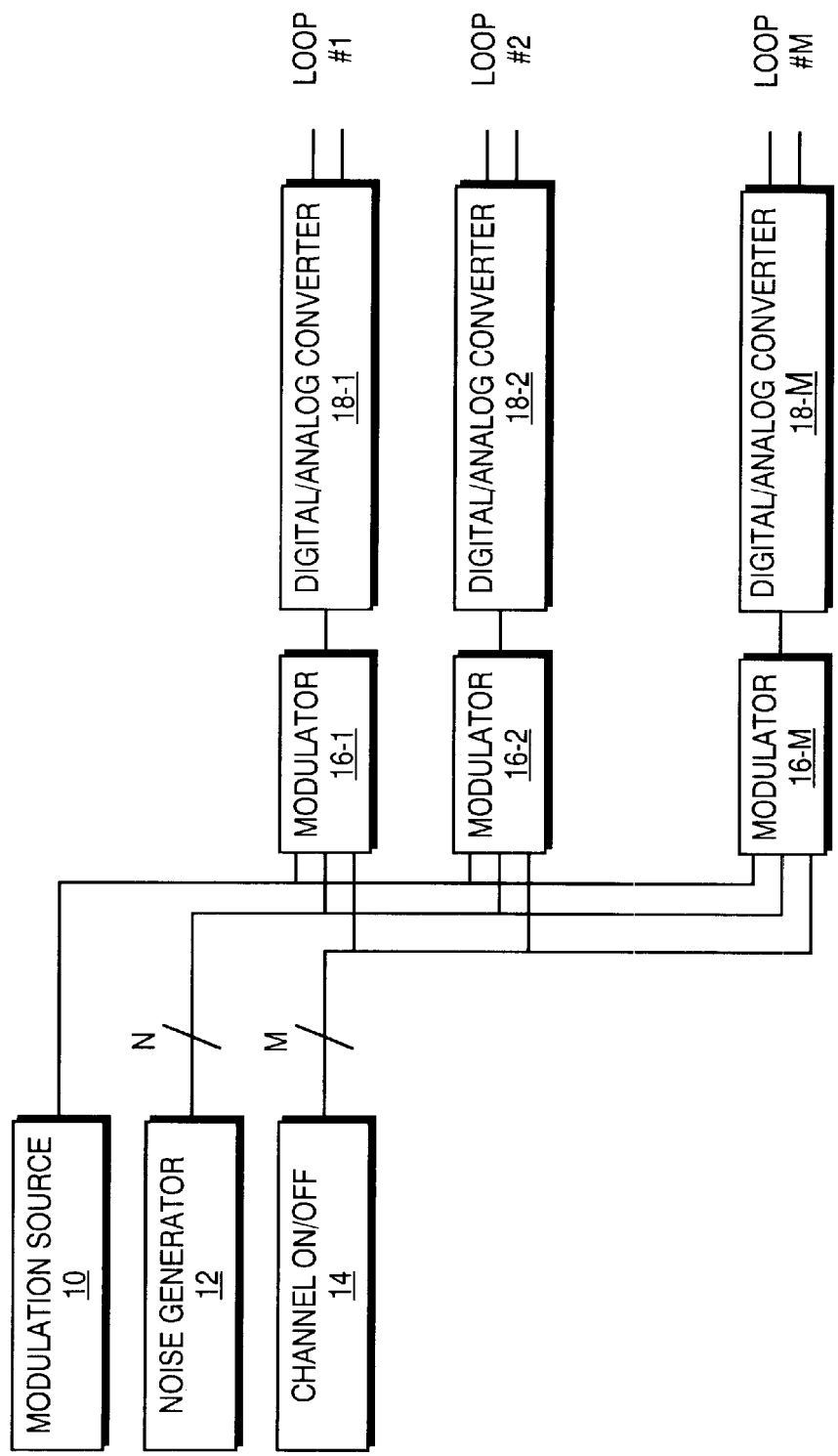
FIG. 2 is a block diagram showing one embodiment of the invention.

FIG. 2 shows one embodiment of the apparatus of the present invention for exciting M loops in a telephone network. Referring to FIG. 2, the apparatus includes a modulation source 10, a noise generator 12 and a channel on/off selector 14, each of which is coupled to a plurality of modulators 16-1 to 16-M. The plurality of modulators are each coupled to digital to analog converters 18-1 to 18-M. Each of digital to analog converters 18-1 to 18-M is coupled to a channel, loop#1 to loop#M, of a telephone network.

Noise generator 12 generates N digital signals. Each digital signal is provided to one of modulators 16-1 to 16-N, to simultaneously excite loop#1 to loop#M with test signals. The digital signals are modulated with a common modulation source 10 for signal leakage and coupling assessment. Channel on/off selector 14 controls the magnitude of channels loop#1 to loop#M to the plurality of test signals. Modulated test signals are converted to analog signals by digital to analog converters 18-1 to 18-M, each of which provides an output to one of M channels.

Modulation source 10 may be implemented with a known broadband or narrowband source, including a CW source, and an on/off source, and may be analog or digital. With a CW source, modulation of the present invention would be continuous. Noise generator 12, also known as a test signal source, generates a plurality of test signals. In one embodiment, the test signals are identical. Also, each of the test signals is modulated by the same modulation signal from modulation source 10. Noise generator 12 may be implemented with any known test signal source and may be digital or analog. One example of a known noise generator is shown in FIG. 3.

Figure 3:
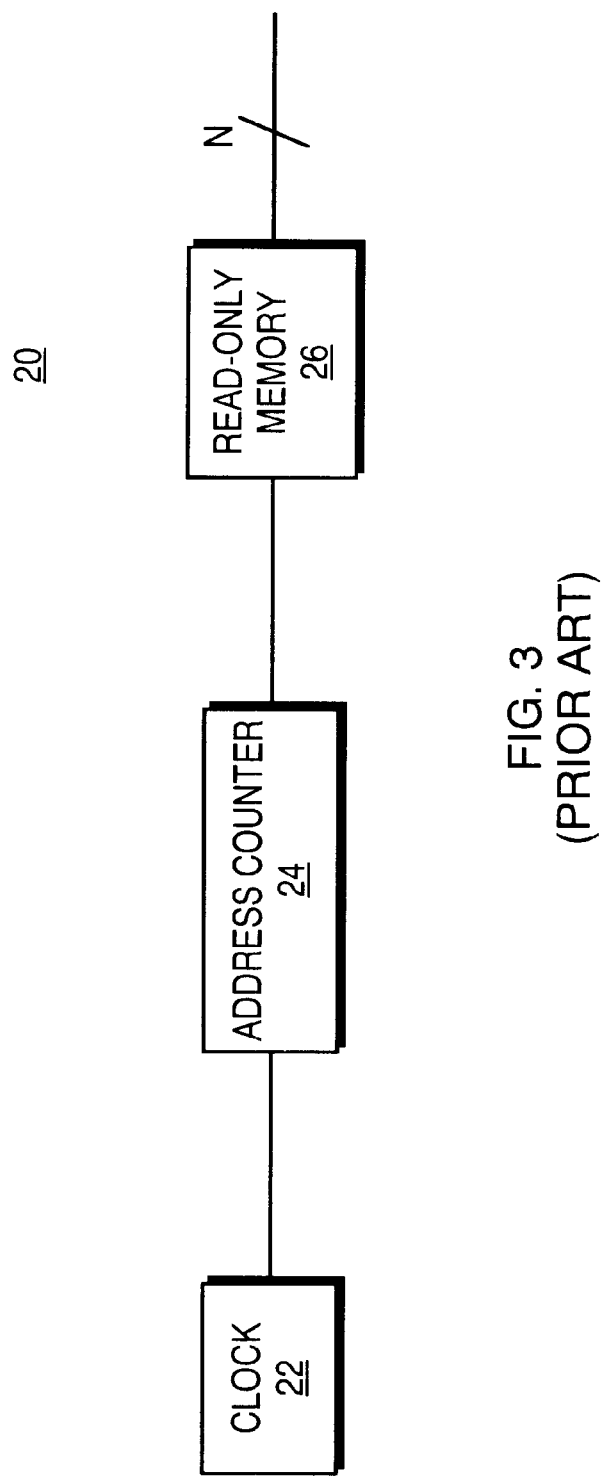
FIG. 3 is a block diagram showing a known implementation of a noise generator.

Referring to FIG. 3, noise generator 20 includes a clock 22, an address counter 24 coupled to clock 22, and a read-only-memory 26 coupled to address counter 24. Noise generator 20 generates N test signals and may alternatively be implemented with a feedback shift register-based generator having a delay to ensure independence of noise outputs between the outputs over the target frequency range.

In another embodiment of the present invention, noise generator 12 generates analog test signals. In this embodiment, digital to analog converters 18-1 to 18-M shown in FIG. 2 would not be necessary.

Referring again to FIG. 2, channel on/off selector 14 controls which of the M channels are turned on or off during leakage or coupling assessment. In other words, all M channels of the telephone network may be turned on or off so that the present invention is able to advantageously ascertain signal leakage or coupling from any given loop. Each of modulators 16-1 to 16-M is coupled to modulation source 10, noise generator 12 and channel on/off selector 14 and modulates the test signals generated by noise generator 12. In one embodiment in which test signals are digital, each of modulators 16-1 to 16-M is coupled to one of digital to analog converters 18-1 to 18-M. In another embodiment in which test signals are analog, digital to analog converters would not be required. In yet another embodiment, coded modulation may be implemented such that a decoding matched detector is able to better identify the specific modulated test signals. A decoding detector may be implemented with any known detector as one used in cable television leakage assessments.

In one implementation of the present invention, a table look-up noise generator generates twenty-four different test signals comprised of random 0s and 1s. The 24 independent test signals, or noise sources, are provided to eight modulator cards, each having 24 inputs. Therefore, this embodiment of the present invention drives 8 by 24 or 192 telephone channels. One-bit digital to analog converters are implemented to provide a modulated test signal to each one of the 192 telephone channels. In addition, each of the 192 channels is individually controllable to be activated or not through a channel on/off selector. A modulation source is multiplied onto each of the output lines such that all the channels are driven simultaneously. This allows the detection and measurement of the modulated test signals by comparing the detector envelope output levels with the modulation envelope when the outputs are turned on to those with the outputs turned off.

Figure 4:
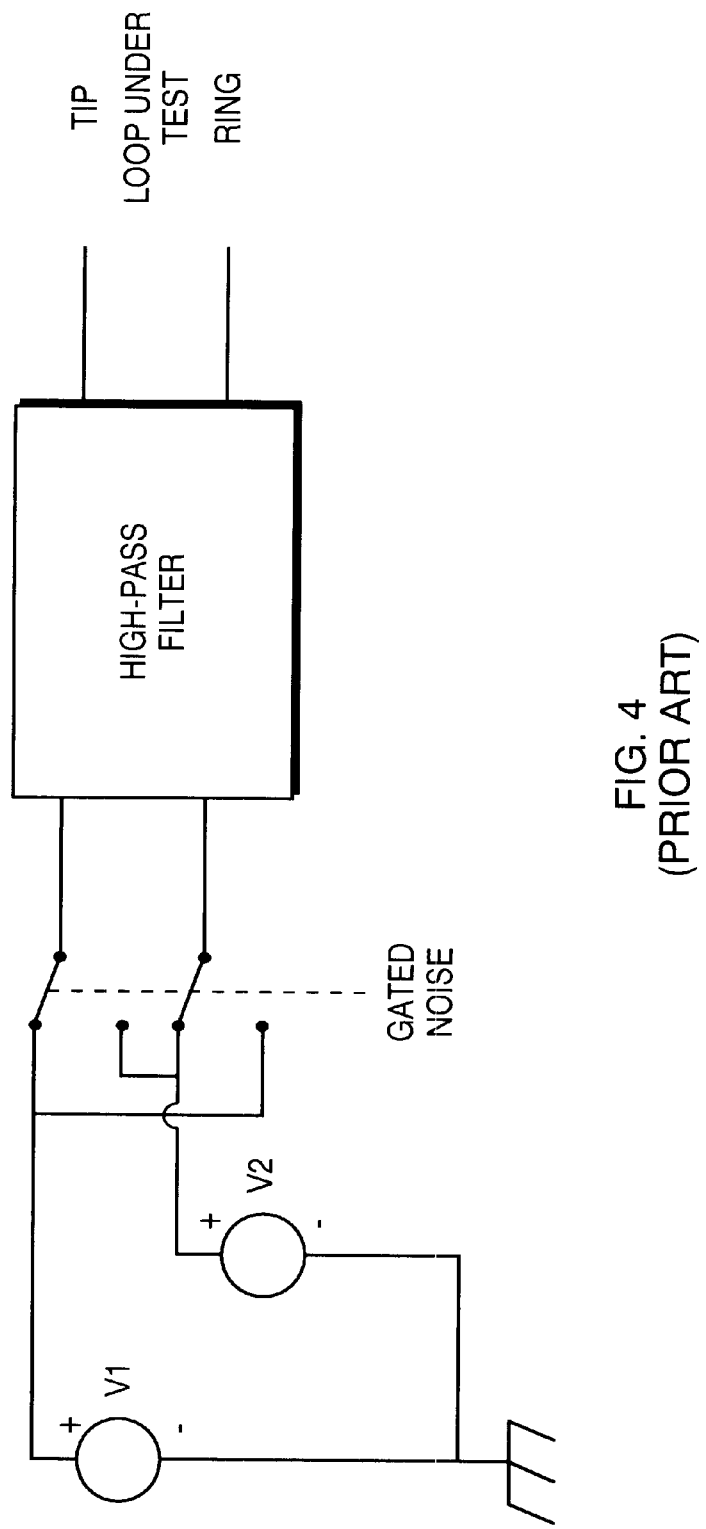
FIG. 4 is a block diagram showing a known implementation of a digital to analog converter coupled to a filter.

FIG. 4 shows an embodiment of a known digital to analog converter 18 coupled to a high-pass filter. Referring to FIG. 4, the digital to analog converter generates different signal levels based on the value of a reference voltage. In the implementation of the present invention, test signal levels are set to the nominal specification level of −60 dBm/Hz as suggested by ANSI TEE1.4, in their proposed requirements document for Very-High-Data-Rate Digital Subscriber Line ("VDSL") applications. In addition, test signals at a higher signal level, −50 dBm/Hz, are selectable to allow investigation of the performance beyond the levels dictated by local noise levels. A high-pass filter is provided in the digital to analog converter output to reduce signal levels at frequencies used by voice-band communications within the cable being tested.

More specifically, the digital to analog converter and filter shown in FIG. 4 is implemented with two voltage sources, one of which is variable to set the output power level. An electronic switch connects the sources to the high-pass filter and alternates the polarity of the connection between the two sources and the load based on the modulated digital test signal. The high-pass filter may be implemented with series connected capacitors (not shown) at both input and output to prevent DC current flow in the filter. The high-pass filter output may be applied to either active or unused channels in actual applications because the filter presents a high bridging impedance at audio frequencies used for telephony.

Figure 5:
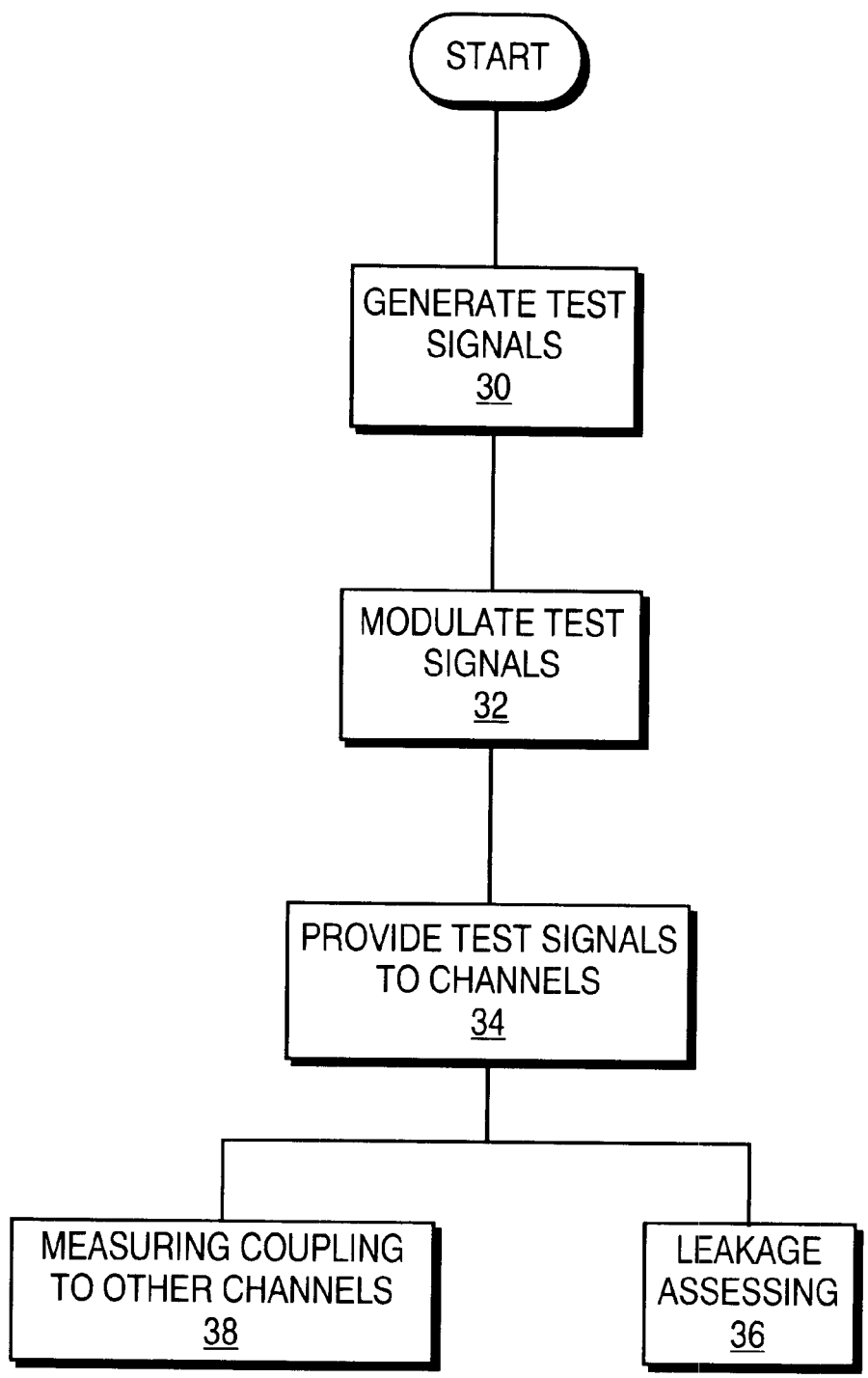
FIG. 5 is a flow chart showing a method of assessing leakage consistent with the present invention.

A method consistent with the present invention assesses signal leakage or coupling in a telephone network. FIG. 5 shows a flow chart of the method. Referring to FIG. 5, for a telephone network having a plurality of channels, the method includes a step of generating a plurality of test signals 30, a step of modulating each of the plurality of test signals with a common modulation source 32, a step of selectively providing each of the plurality of test signals to the plurality of channels 34, and assessing test signal radiation from the plurality of channels 36. In addition, the method includes a step of measuring test signals coupled to the other plurality of channels 38 with the step of assessing test signal coupling to one of the plurality of channels 38. The test signals generated in step 30 may be digital or analog. When the generated test signals are digital, the method additionally provides digital to analog conversion of the test signals (not shown).

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for assessing signal leakage in a telephone network having a plurality of channels over which audio signals are transmitted, the apparatus comprising:

a signal generator providing a plurality of test signals to the plurality of channels at a signal level that is below a level that would cause interference to the audio signals transmitted over the telephone network;

a channel control for selectively connecting and disconnecting each of said test signals to each of the plurality of channels so as to enable the signal leakage from a selected number of the plurality of channels to be assessed, wherein the signal leakage from each of the selected number of channels is assessed simultaneously and is assessed without disrupting the transmission of audio signals over the selected number of channels.

2. The apparatus as claimed in claim 1 further comprising a modulator to modulate one of said test signals, said modulator being coupled to one of the plurality of channels.

3. The apparatus as claimed in claim 2 further comprising a modulation source coupled to each of said plurality of modulators.

4. The apparatus as claimed in claim 1 wherein the signal level of said test signals is −60 dBm/Hz applied to each of said connected channel.

5. The apparatus as claimed in claim 1 wherein said test signals are broadband signals.

6. The apparatus as claimed in claim 1 wherein said test signals are digital.

7. The apparatus as claimed in claim 1 wherein said test signals are analog.

8. The apparatus as claimed in claim 1 wherein said signal generator comprising, a clock;

an address counter coupled to said clock; and a read-only-memory coupled to said address counter.

9. The apparatus as claimed in claim 6 further comprising a converter coupled to one of the plurality of channels to convert one of said plurality of digital test signals to an analog signal.

10. An apparatus for assessing signal leakage in a telephone network having a plurality of channels, comprising:

a signal generating means for generating a plurality of broadband test signals;

a plurality of modulators, each coupled to one of the plurality of channels, for simultaneously exciting said plurality of channels with said plurality of test signals;

a modulation source coupled to the plurality of modulators for modulating said plurality of test signals; and control means coupled to said plurality of modulators for selectively coupling and decoupling each of the plurality of channels to said signal generating means so as to enable the signal leakage from a selected number of the plurality of channels to be assessed.

11. The apparatus as claimed in claim 10 wherein the signal level of said test signals is below the signal level that would cause interference to an audio signal transmitted in the telephone network.

12. The apparatus as claimed in claim 10 further comprising a modulation source coupled to said plurality of modulators.

13. The apparatus as claimed in claim 10 further comprising a digital to analog converter coupled to one of said plurality of modulators.

14. The apparatus as claimed in claim 10 wherein said signal generating means comprising, a clock;

an address counter coupled to said clock; and a read-only-memory coupled to said address counter.

15. A method for assessing signal leakage in a telephone network having a plurality of channels over which telephony signals are transmitted, comprising:

generating a plurality of test signals;

modulating each of said plurality of test signals with a common modulation source;

selectively providing each of said plurality of test signals to the plurality of channels;

assessing test signal leakage from the plurality of channels without disrupting the transmission of telephony signals; and measuring test signal coupling to at least one of the plurality of channels.

16. The method as claimed in claim 15 wherein the signal level of said plurality of test signals is below the signal level that would cause interference to an audio signal transmitted within the telephone network.

17. The method as claimed in claim 15 wherein said step of selectively providing each of said plurality of test signals comprises driving each of the plurality of channels at a power level of −60 dBm/Hz.

18. The method as claimed in claim 15 wherein said step of generating a plurality of test signals comprises a step of generating a plurality of digital test signals.

19. The method as claimed in claim 15 wherein said step of generating a plurality of test signals comprises a step of generating a plurality of analog test signals.

20. The method as claimed in claim 17 further comprising a step of providing digital to analog conversion of said plurality of test signals.

21. The method as claimed in claim 15 wherein said step of generating a plurality of test signals comprises a step of generating a plurality of broadband test signals.

22. The method as claimed in claim 15 wherein said step of modulating each of said plurality of test signals with a common modulation source comprises a step of coded modulation.

* * * * *